Patented Feb. 10, 1953

2,628,170

UNITED STATES PATENT OFFICE 2,628,170

SOLVENT-SOLUBLE WATER-REPELLENCY COMPOSITIONS

Larry Q. Green, New Castle County, Del., assignor to E. I. du Pont de Nemours and Company, Wilmington, Del., a corporation of Delaware No Drawing. Application February 23, 1950, Serial No. 145,893

7 Claims. (Cl. 106—271)

This invention relates to a new composition of matter useful in treating fabrics, to render them water-repellent.

It is an object of this invention to provide a water-repellency composition adapted primarily for use in dry cleaning establishments, and especially suitable for the application to finished garments. Another object is to produce a water-repellency composition of the aforenoted type, but characterized by simplicity of application to the fabric, rendering for instance unnecessary the hitherto customary curing step. A further object is to produce a water-repellency composition employing a paraffin wax as the essential water-repellency factor but improving its uniform distribution and effectiveness when applied to the fabric. A still further object is to produce a storage-stable composition available for ready use by a dry cleaner and requiring merely thinning or dissolution in one of the customary dry-cleaning fluids, for instance Stoddard solvent, to be ready for use. Various other useful objects and effects of my invention will appear as the description proceeds.

Solvent soluble water-repellent compositions have been manufactured and used for many years. One of the earliest useful compositions was described in U. S. Patent 93,102, issued in 1869. This patent relates the use of paraffin wax, a volatile solvent and an aluminum soap (stearate) as a water-repellent composition. In all the intervening years since this patent was issued, no basic or marked improvement has been made in the composition, except perhaps through the use of purer starting materials. The greatest demand for a product of this type is from dry cleaning establishments who desire a composition for use in imparting a water-repellent finish to raincoats and other garments after they have been dry cleaned. The most commonly used cleaning solvent is a petroleum fraction boiling from 145°–200° C., having a flash point of 100°–110° F., and known as Stoddard solvent in the trade. A more precise definition of this solvent may be found in the literature. See for instance, "The Condensed Chemical Dictionary," 3d ed., page 604 or "Chemicals of Commerce" by Snell, page 185.

A useful water-repellent composition must have an appreciable solubility in this solvent. This solubility requirement has remained one of the most troublesome factors in the utilization of the aluminum stearate-wax mixture. Thus, one of the present day commercial products requires heating to 120° F. in order to make a 10% solution thereof in Stoddard solvent in a reasonable length of time. But inasmuch as the flash point of the solvent is only at about 100°–110° F., a dangerous fire hazard exists when using this product. Another serious drawback to the present day products containing aluminum soaps and wax is that they do not lead to a high degree of water-repellency, especially as compared with the recently developed so-called permanent water-repellents, for instance stearamido-methyl-pyridinium chloride (U. S. P. 2,146,392).

The solubility of aluminum soaps in hydrocarbon solvents may be improved somewhat by the addition of a small amount of an amino alcohol; but the solubility of the product is still far from ideal.

Attempts have been made to obtain a more satisfactory product by replacing the relatively insoluble aluminum soaps in the composition with a more soluble soap. One such soap, zirconium stearate, has been found to give a composition with greatly improved solubility characteristics. Unfortunately, the products obtained were not stable to storage and were too high in cost.

I have now found that an efficient water-repellent with excellent solubility and stability characteristics can be made, while still using a paraffin wax or some other convenient hydrocarbon wax as principal water-repellency factor, if an ortho ester of titanium is incorporated into the wax-solvent mixture. The resultant composition on application to fabrics from an organic solvent solvent leads to a much greater repellency effect than a simple wax-solvent mixture or the mixtures comprising wax, solvent and aluminum soap. In addition, my new water-repellency composition dissolves readily in the customary dry cleaning solvents (hydrocarbon fractions or chlorinated hydrocarbons) at temperatures as low as 75°–80° F., which is by a wide, safe margin below the flash point of Stoddard solvent or similar hazardous hydrocarbon fractions. Some of the new products, in fact, represent the ultimate in solubility characteristics for wax-containing compositions, for they dissolve as readily as a mixture containing nothing but wax and solvent.

Furthermore, I have found that the novel water-repellency compositions of this invention possess the remarkable advantage in that the fabrics treated therewith require no cure (i. e. heat treatment) to develop their maximum water-repellency. This is a most surprising property, inasmuch as most of the water-repellency compositions on the market today, whether of the wax-aluminum soap variety or of the permanent water-repellent type, require drying at temperatures of about 105° to 175° C. for periods of time varying from a few seconds to half an hour. Since curing facilities are generally not available in dry cleaning establishments where most of my novel products are intended for use, my invention thereby offers a distinct practical advantage.

Inasmuch as my novel composition is intended to be applied to fabric from the standard dry cleaning solvents, which are generally water-immiscible, non-polar solvents, it is necessary that the titanium compound selected for my invention shall be soluble in such solvents. A high order of solubility, however, is not required, inasmuch as my novel adjuvants are efficient even in very small quantities, say 0.15 part by weight for each 100 parts of wax employed. Considering further that in dry cleaning practice, the concentration of waxy material in the non-polar solvent is of the order of 5% by weight and seldom exceeds 10% by weight, it is clear that if the organic titanium compound is soluble to an extent of 0.01 part per 100 parts of non-polar solvent, it can be employed usefully in my invention. Accordingly, and for the sake of defining precisely the conditions for testing the suitability of any given titanium compound, I shall select Stoddard solvent as standard liquid and will specify that a solubility of 0.01% by weight in Stoddard solvent shall be construed as sufficient solubility for the purposes of this invention.

Apart from the above limitation as to solubility, I have found no limitation upon the chemical structure or physical nature of the titanium compound to be employed. Liquid and solid titanium compounds work equally well, if they satisfy the said minimum solubility requirements.

Of course, it will be appreciated that the specified solubility test itself rules out many organic structural types of titanium compounds. Thus, titanium compounds in which the organic radicals carry sulfo or carboxy groups (i. e. water-solubilizing, hence polar groups) are generally unsuitable. Likewise, titanium compounds whose organic radicals are long polymeric chains will be generally insoluble, and therefore ruled out. An interesting illustration on this point is the reaction product obtained by reacting, say, tetra-isopropyl titanate with an alkyl 1,3-diol. If the diol has a methyl or ethyl substituent in the 2-position (as for instance in the case of 2-ethyl-1,3-hexanediol), polymerization is for some reason inhibited, and a product having good solubility in Stoddard solvent is obtained. If however 1,3-butanol is employed, which has no substituents in the 2-position, polymerization takes place in the reaction, and the product is not sufficiently soluble in non-polar solvents to satisfy my specifications above. However, this particular modification of my invention is described in further detail and claimed in my divisional application Serial No. 215,640, filed March 14, 1951.

In agreement with the above general outline, I find the following types of titanium compounds operative and especially desirable in view of economic availability, relative freedom from color, etc.

1. Tetraalkyl titanates of the general formula

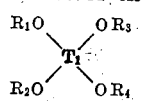

wherein the several R's may be alike or different, and represent alkyl groups of from 3 to 30 carbon atoms. Typical compounds of this type that have been used successfully are:

Tetraisopropyl titanate, $(C_3H_7O)_4Ti$;
Tetra-n-butyl titanate, $(C_4H_9O)_4Ti$;
Tetraoctadecyl titanate, $(C_{18}H_{37}O)_4Ti$;
Dioctadecyl-diisopropyl titanate, $$(C_3H_7O)_2Ti(OC_{18}H_{37})_2$$

Monobutyl-trioctadecyl titanate, $$(C_4H_9O)Ti(OC_{18}H_{37})_3$$

and

Carnaubyl-tributyl titanate, $$(C_{24}H_{49}O)Ti(OC_4H_9)_3$$

2. Compounds of the same general formula as above, except that some or all of the R's are araliphatic or cycloaliphatic hydrocarbons. As typical, practical illustrations of this group, may be mentioned dibenzyl-dibutyl titanate and dicyclohexyl-dibutyl titanate.

3. Halogen derivatives of the compounds named under groups 1 and 2, for instance, Di(octafluoro-pentyl)-dibutyl titanate, $$(HCF_2.CF_2.CF_2.CF_2.CH_2O)_2Ti(OC_4H_9)_2$$

Di(2,2'-dibromoisopropyl)-diisopropyl titanate,

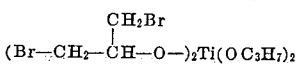

Di(o-chlorobenzyl)-diisopropyl titanate, $$(Cl-C_6H_4-CH_2-O)_2Ti(OC_3H_7)_2$$

Di(3-chloropropyl)-diisopropyl titanate, $$(ClCH_2-CH_2-CH_2-O)_2Ti(OC_3H_7)_2$$

and

Di(2,2'-dichloroisopropyl)-diisopropyl titanate,

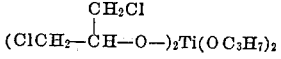

The above compounds may be prepared by methods which are per se known in the art. See for instance, British Patent 479,470, Fieser and Fieser, "Organic Chemistry" (1944), page 182 and Post, "Chemistry of the Aliphatic Ortho Esters" (1943), page 133.

In the cases above, where unsymmetrical titanates are indicated, these may be prepared by heating a symmetrical, lower alkyl titanium tetraester with an optional proportion of a different alcohol or diol, whereby a mixed reaction product is obtained. Moreover, such mixed reaction products may be used directly in this invention, that is without regard to the degree of alkyl radical interchange which has taken place and without separation into their constituents.

In the case of those titanium compounds which possess long alkyl chains, for instance the titanates or mixed reaction products possessing octadecyl ($C_{18}$) or carnaubyl ($C_{24}$) radicals, the ester itself may have to some extent water-repellency characteristics. There is, therefore, no upper limit to the quantity of titanium compound that may be incorporated in a given quantity of paraffin wax, inasmuch as the excess does no harm. But from the viewpoint of economics, a quantity of titanium compound corresponding to between 0.15% and 25% of the weight of paraffin wax employed constitutes the preferred range.

As for the waxy component, any wax customarily employed or suitable to be employed for imparting water-repellency to textile fibers may be employed in this invention. More specifically, I may use natural or synthetic paraffin waxes, low-molecular polyethylenes, petrolatum wax or in general any hydrocarbon wax melting within the range of 33° C. to 90° C. The optimum waxes, however, from the standpoint of efficiency and solubility are those melting at about 60° to 70° C.

For the purpose of facilitating the use of my novel composition by the practical man in the dry cleaning trade, I prefer to prepare the same for the market in the form of a paste or semi-fluid by adding thereto an optional quantity of an organic liquid selected from among those customarily employed as dry cleaning solvents, for instance Stoddard solvent, carbontetrachloride, trichlorethylene and tetrachlorethylene or of some other convenient, non-polar solvent, for instance benzene or monochlorobenzene. A quantity of such liquid amounting to about 40% by weight of the entire marketable composition will generally produce a product of pasty consistency which dissolves readily when added to a further quantity of a dry-cleaners fluid. But the practice may obviously be varied within wide limits.

I find that the novel compositions of my invention are applicable with success to almost any conceivable textile fiber. Among those actually tested by me are cotton gabardine, poplin, sateen, jean cloth, viscose rayon, wool crepe, nylon and polymeric acrylonitrile fiber. The coatings have been applied both by immersion and by spraying. Wax loadings of 25% or more (based on fabric) can be used, but 1 to 15% is a more practical range, and 3 to 6% is preferred.

As already noted, curing is superfluous when my novel composition is employed. Consequently, the next step after impregnation is simply "drying," that is evaporation of the solvent off the treated fabric.

Without limiting my invention, the following examples are given to illustrate my preferred mode of operation. Parts mentioned are by weight. The method employed in these examples for evaluating the water-repellency produced is that described in the Technical Manual and Yearbook of the American Association of Textile Chemists and Colorists, vol. XXIV, pp. 47–48, 1947–1948. In this method, the fabrics are subjected to a water spray under a standard set of conditions and the degree of wetting is estimated by comparing the partially wetted fabrics to a set of standards on a chart. The fabrics are then assigned ratings of 0, 50, 70, 80, 90, or 100 on the basis of the comparison to the standards.

*Example 1*

2.5 parts by weight of dibutyl dioctadecyl titanate and 57.5 parts by weight of a paraffin wax melting at 64° C. are added to 40 parts by weight of Stoddard solvent. The mixture is heated at 65° C. until solution is complete. On cooling, the product sets up to a colorless or light yellow soft paste. One part of this product is then dissolved in 20 parts of Stoddard solvent and applied to cotton jean cloth. The "pick-up" of product is adjusted to 3% total solid (corresponding to 0.125% titanate ester). After the solvent has evaporated the treated fabric is found to give a test rating of 90 or better. When the wax alone is loaded at 3%, the rating is only 50, and the titanate ester at a loading of .125% gives a repellency value of zero.

*Example 2*

10 parts by weight of dibutyl dioctafluoropentyl titanate and 50 parts by weight of paraffin wax are added to 40 parts by weight of Stoddard solvent and the mixture warmed until solution is complete. On cooling, a white to pale yellow soft paste is obtained. This product, when applied from Stoddard solvent to jean cloth at a 3% wax loading, gives a spray rating of 90 or better.

*Example 3*

In the same manner as in Examples 1 and 2 a formulation is prepared containing 10 parts by weight of tetraoctadecyl titanate, 50 parts by weight of paraffin wax (M. P. 65° C.) and 40 parts by weight of Stoddard solvent. The formulation is applied by the same procedure as in Example 1. A spray test rating of better than 90 is obtained at 3% wax loading on jean cloth.

*Example 4*

2.5 parts of tetraisopropyl titanate, 57.5 parts of paraffin wax (M. P. 65° C.) and 40 parts of Stoddard solvent are prepared into a formulation in the same manner as in Examples 1 and 2. At 3% wax loading on jean cloth, a spray test rating of 90 or better is obtained.

*Example 5*

To 20 parts of Stoddard solvent is added 1.2 parts of 2-ethyl-1,3-hexanediol and 0.8 part of tetraisopropyl titanate. An immediate reaction occurs with the liberation of heat and the formation of a mixed titanate ester. 58 parts of molten paraffin wax (M. P. 65° C.) and 20 parts of Stoddard solvent are then added and the mixture is stirred until homogeneous. The colorless liquid sets up to a thin white paste on cooling. A spray test rating of 90 or better is obtained when this formulation is applied at 3% wax loading to jean cloth.

*Example 6*

5 parts of dibutyl dicyclohexyl titanate and 6 parts of wax (M. P. 64° C.) are dissolved in 189 parts of Stoddard solvent. Samples of cotton gabardine fabric are then immersed in this solution, passed between rollers to remove excess solvent and dried. The pick-up of wax is 3% or less based on the weight of dry fabric.

The treated fabric is found to give a spray test rating of 100.

*Example 7*

Dibutyl dibenzyl titanate is used instead of dibutyl dicyclohexyl titanate in the procedure of Example 6. A spray test rating of 100 is obtained.

*Example 8*

One part of diisopropyl dicarnaubyl titanate and 12 parts of wax are dissolved in 388 parts of Stoddard solvent. When a sample of cotton gabardine fabric is treated with this mixture in the manner described in Example 6, a spray test rating of 100 is obtained.

*Example 9*

A composition was prepared containing 0.25 part of di(2,2'-dibromoisopropyl)-diisopropyl titanate, 3 parts of paraffin wax (M. P. 64° C.) and 97 parts of Stoddard solvent. A sample of cotton sateen fabric was immersed in the above solution, passed between rollers to remove excess solution and dried. It showed a spray rating of 80. When another sample of the same fabric was immersed in a solution of 3 g. paraffin wax (M. P. 64° C.) in 97 g. of Stoddard solvent but containing no Ti ester, the spray rating was 0.

Example 10

The procedure was the same as in Example 9, except that di(o-chlorobenzyl)-diisopropyl titanate was employed in lieu of the ester there named. On cotton sateen, a spray rating of 100 was obtained.

Example 11

The procedure was the same as in Example 9, except that di(3-chloropropyl)-diisopropyl titanate was employed. A spray rating of 100 was obtained.

Example 12

The procedure was the same as in Example 9 except that di(2,2'-dichloro-isopropyl)-diisopropyl titanate was employed. The spray rating obtained was 100.

Example 13

Same procedure as in Example 19, except that the catalyst employed was the ester obtained by heating 2 moles of hydroxy stearic acid with 1 mole of tetra-n-butyl titanate. A spray rating of 80 was obtained on jean cloth.

Example 14

Solutions of titanate ester (prepared from 2 parts of tetrapropyl titanate and 3 parts of 2-ethyl-1,3-hexanediol) plus paraffin wax were made in benzene, chlorobenzene and in carbon tetrachloride. The ester:wax ratios were 1:30, and the wax concentration in the solvent was 4.5% in all cases. Samples of jean cloth and gabardine treated with these solutions at 3 to 4% wax loadings (based on fabric) gave spray test ratings of 100.

Example 15.—(Using a petrolatum wax)

Six grams of a white petrolatum wax (turbidity temperature 55° C.) were dissolved in 194 grams of Stoddard solvent to give a clear solution. 0.5 gram of the titanate ester obtained from 1 part of tetraisopropyl titanate and 1.5 parts of 2-ethyl-1,3-hexanediol (cf. Example 5 above) was then added. A sample of cotton gabardine was immersed in this solution for a few minutes, passed through rollers to remove excess solvent, leaving about 3% wax on the fabric. After air drying of the fabric the spray test rating was found to be 70. When the process was duplicated except for omitting the titanate ester, the spray test rating was zero.

Example 16.—(Using a ceresin wax)

The procedure in Example 15 was repeated except that 6 grams of a petroleum ceresin wax (M. P. 55°–57° C.) was substituted for petrolatum wax, and cotton jean cloth was used as the test fabric. In this case also the fabric treated with the wax and solvent alone gave a spray test rating of zero, whereas the fabric treated according to this invention showed a rating of 70.

Example 17.—(Using a synthetic wax)

Six grams of a hydrogenated polyolefin wax were dissolved in 194 grams of Stoddard solvent. This wax was of a medium molecular weight consisting of 85%–90% straight-chain hydrocarbons and had a melting point of 60° C. 0.5 gram of tetra-n-butyl titanate was then added. A cotton poplin fabric immersed in this solution, wrung out and dried, gave a spray test rating of 90. When the same process was repeated except for omitting the titanate ester, a spray rating of zero was obtained.

It will be understood that the proportions and details of procedure in the above examples may be varied within the skill of those engaged in this art, without departing from the spirit of this invention.

I am aware of the fact that certain titanium esters, more particularly, those having the octadecyl radical or other long chain alkyl groups, have to a limited extent the power to render fabric water-repellent by themselves. Such powers are very limited in that they require loading the fabric with a large quantity of the titanate (about 6% by weight of the fabric), they require curing the fabric (heating at about 105° to 150° C.), and often discolor the fabric to such an extent as to render such agents utterly inapplicable in practice. By contrast, in my invention, only a small quantity of titanate is put upon the fiber (less than 2% and more often in the range of 0.01 to 0.2%). No curing of the fabric is needed, and no discoloration is observed. Furthermore, my invention is not limited to titanates having long-chain alkyl radicals, but works equally well with short-chain titanium esters, which per se have no water-repellency powers.

It is clear that in my invention, I deal with an effect akin to catalysis or synergism, wherein one agent (the titanate) influences the normal activity of another agent (the water-repellency power of the wax), and increases the latter to an extent entirely unpredictable from the nature and properties of the first agent itself.

I claim as my invention:

1. A water-repellency composition adapted to be applied to textile fiber from a hydrocarbon solvent, said composition comprising as predominant water-repellency factor an anhydrous mixture of a hydrocarbon wax whose melting range is within the limits of 33° C. to 90° C. and an organic titanium compound of the general formula

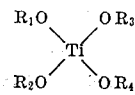

wherein $R_1$, $R_2$, $R_3$ and $R_4$ designate monomeric organic radicals, selected from the group consisting of aliphatic, cycloaliphatic and araliphatic hydrocarbon radicals and halogen derivatives of such radicals, the proportion of said titanium compound to said hydrocarbon wax being not less than 0.15% and not more than 25% by weight.

2. A water-repellency composition as defined in claim 1, said composition comprising further a non-polar organic liquid in proportion sufficient to give the entire composition a pasty to semifluid consistency.

3. A water-repellency composition adapted to be applied to textile fiber from a hydrocarbon solvent, said composition comprising as predominant water-repellency factor an anhydrous mixture of a paraffin hydrocarbon melting within the limits of 33° C. to 90° C., on the one hand, and an aliphatic tetraester of titanium, on the other hand, said tetraester of titanium being a tetraalkyl titanate whose alkyl radicals have each not less than 3 and not more than 30 carbon atoms, and being present in said mixture to an extent of not less than 0.15% and not more than 25% by weight based on the weight of said paraffin hydrocarbon.

4. A water-repellency composition as in claim 3, the tetraester of titanium being a symmetrical tetraalkyl ester of titanium whose alkyl radicals contain not over 4 carbon atoms.

5. A water-repellency composition as in claim 3, the tetraester of titanium being the reaction product of a symmetrical tetraalkyl titanate whose alkyl radicals contain not over 4 carbon atoms with an aliphatic alcohol of 18 to 24 carbon atoms.

6. A water-repellency composition for textile fiber consisting essentially of an anhydrous mixture of (a) a hydrocarbon wax of a melting range with the limits of 33° to 90° C., (b) a tetraalkyl titanate wherein each alkyl radical possesses not less than 3 and not more than 30 carbon atoms, and (c) a non-polar organic liquid, the quantity of tetraalkyl titanate being between 0.15% and 25% by weight with reference to the wax, and the quantity of organic liquid being sufficient to impart to the entire composition a pasty to semifluid consistency.

7. A composition of matter as in claim 6, the organic liquid being a petroleum fraction boiling between 145° and 200° C.

LARRY Q. GREEN.

REFERENCES CITED

The following references are of record in the file of this patent:

UNITED STATES PATENTS

| Number | Name | Date |
|---|---|---|
| 278,443 | Maxfield | May 29, 1883 |
| 2,345,142 | Muller | Mar. 28, 1944 |

OTHER REFERENCES

Industrial and Engineering Chemistry, October 1949, pp. 7A and 10A.

"Organic Compounds of Titanium," Industrial and Engineering Chemistry, vol. 42, issue 2, Feb. 2, 1950, pp. 251–253.